US012617447B2

(12) United States Patent
Yi

(10) Patent No.: US 12,617,447 B2
(45) Date of Patent: May 5, 2026

(54) WHEEL BRAKING MECHANISM, FRAME, AND CHILD CARRIER

(71) Applicant: WONDERLAND SWITZERLAND AG, Steinhausen (CH)

(72) Inventor: Xiaolong Yi, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 552 days.

(21) Appl. No.: 18/177,816

(22) Filed: Mar. 3, 2023

(65) Prior Publication Data

US 2023/0278614 A1 Sep. 7, 2023

(30) Foreign Application Priority Data

Mar. 3, 2022 (CN) .......................... 202210203098.5

(51) Int. Cl.
B62B 9/08 (2006.01)
B60T 1/00 (2006.01)
(Continued)

(52) U.S. Cl.
CPC ................ B62B 9/08 (2013.01); B60T 1/005 (2013.01); F16D 63/006 (2013.01); F16D 65/00 (2013.01);
(Continued)

(58) Field of Classification Search
CPC ......... B62B 9/08; B62B 7/00; B62B 2202/42; B60T 1/005; F16D 63/006; F16D 65/00; F16D 65/16; F16D 2121/14
(Continued)

(56) References Cited

U.S. PATENT DOCUMENTS 5,765,665 A * 6/1998 Cheng ..................... B62B 9/087
188/31
11,827,266 B2 * 11/2023 Zhu ........................ F16D 63/006
(Continued)

FOREIGN PATENT DOCUMENTS

AU 2008100809 A4 9/2008
CN 2505362 Y 8/2002
(Continued)

OTHER PUBLICATIONS

Taiwan Office Action issued in corresponding Taiwan Application No. 112102581, dated Nov. 1, 2023, pp. 1-27.
(Continued)

*Primary Examiner* — James A Shriver, II
*Assistant Examiner* — Hilary L Johns
(74) *Attorney, Agent, or Firm* — HAUPTMAN HAM, LLP

(57) ABSTRACT

The present application relates to a wheel braking mechanism, a frame and a child carrier. The wheel braking mechanism includes a wheel base housing assembly, a braking assembly mounted in the wheel base housing assembly, and a braking pin connected to the braking assembly. A side wall of the wheel base housing assembly is provided with a sliding hole configured to allow the braking pin to extend through. The braking pin is capable of sliding in the sliding hole between a locking position and an unlocking position. The wheel braking mechanism further includes a dust shield. The dust shield is engaged with the braking pin and shields the sliding hole to prevent external debris from entering an interior of the wheel base housing assembly through the sliding hole.

58 Claims, 8 Drawing Sheets

(51) Int. Cl.

| | | |
|---|---|---|
| *F16D 63/00* | (2006.01) |
| *F16D 65/00* | (2006.01) |
| *F16D 65/16* | (2006.01) |
| *B62B 7/00* | (2006.01) |
| *F16D 121/14* | (2012.01) |

(52) U.S. Cl.
CPC ............... *F16D 65/16* (2013.01); *B62B 7/00* (2013.01); *B62B 2202/42* (2013.01); *F16D 2121/14* (2013.01)

(58) Field of Classification Search
USPC ......................................................... 280/79.2
See application file for complete search history.

(56)  References Cited

U.S. PATENT DOCUMENTS

| | | | | |
|---|---|---|---|---|
| 2009/0139805 | A1 * | 6/2009 | Santamaria | ............. B62B 9/082 |
| | | | | 188/20 |
| 2009/0289431 | A1 | 11/2009 | Geeslin | |
| 2022/0135106 | A1 * | 5/2022 | Zhu | ......................... B62B 9/087 |
| | | | | 188/20 |

FOREIGN PATENT DOCUMENTS

| | | | | | |
|---|---|---|---|---|---|
| CN | 101445123 | A | 6/2009 | |
| CN | 201566411 | U | 9/2010 | |
| CN | 205632617 | U | 10/2016 | |
| CN | 205675095 | U | 11/2016 | |
| CN | 207657886 | U | 7/2018 | |
| CN | 108502004 | A | 9/2018 | |
| DE | 29612579 | U1 | 9/1996 | |
| EP | 2821316 | A1 * | 1/2015 | ............. B62B 9/087 |
| EP | 2821316 | B1 | 4/2017 | |
| ES | 1066681 | U | 2/2008 | |
| GB | 459184 | A | 1/1937 | |
| TW | 160301 | U | 6/1991 | |
| TW | 201509705 | A | 3/2015 | |

OTHER PUBLICATIONS

First Office Action in Corresponding Chinese Application No. 202210203098.5, dated Jul. 28, 2025; 11 pgs.

* cited by examiner

WHEEL BRAKING MECHANISM, FRAME, AND CHILD CARRIER

CROSS-REFERENCE TO RELATED APPLICATIONS

This application claims priority of Chinese Patent Application No. 2022102030985, filed on Mar. 3, 2022, the content of which is hereby incorporated by reference in its entirety.

TECHNICAL FIELD

The present application relates to a wheel braking mechanism, a frame, and a child carrier.

BACKGROUND

FIG. 1 is a partial structure of a frame of a baby carrier. A leg 200 of the frame is provided with a wheel braking mechanism 300, a driving member 310 of the wheel braking mechanism 300 is stepped on by a user with foot, a braking pin (not shown in the figure) of the wheel braking mechanism 300 can be moved to a locking position for locking a wheel 400 of the baby carrier, thereby preventing the baby carrier from moving accidentally and improving a safety of the baby carrier. When the user lifts the driving member 310 of the wheel braking mechanism 300, the braking pin of the wheel braking mechanism 300 can move to an unlocking position for unlocking the wheel 400, and the baby carrier is allowed to be pushed.

The wheel braking mechanism 300 generally includes a wheel base housing assembly 320, a braking assembly (not shown in FIG. 1) and the braking pin (not shown in FIG. 1). During the use of the baby carrier, dust, sand, pebbles, water and other external debris can easily enter an interior of the wheel base housing assembly 320. In order to facilitate the discharge of the debris, a bottom of the wheel base housing assembly 320 is provided with a discharge hole 321. However, limited by a position and a diameter of the discharging hole 321, the debris entering the interior of the wheel base housing assembly 320 may not be discharged in time. When the debris accumulates in the interior of the wheel base housing assembly 320 to a certain extent, it may affect a normal braking function of the braking assembly.

SUMMARY

According to some embodiments of the present application, a wheel braking mechanism, a frame, and a child carrier are provided.

According to an aspect of the present application, a wheel braking mechanism is provided. The wheel braking mechanism includes a wheel base housing assembly, a braking assembly mounted in the wheel base housing assembly, a braking pin connected to the braking assembly, and a dust shield engaged with the braking pin. A side wall of the wheel base housing assembly is provided with a sliding hole, the braking pin is capable of sliding in the sliding hole between a locking position and an unlocking position. When the braking pin slides in the sliding hole, the dust baffle shields the sliding hole.

According to another aspect of the present application, a frame is provided. The frame includes above-mentioned wheel braking mechanism, a leg connected to the wheel base housing assembly; and a wheel. A wheel shaft of the wheel is connected to the wheel base housing assembly, a wheel hub of the wheel is circumferentially provided with a plurality of locking grooves, when the braking pin slides to the locking position, the braking pin is snapped into one of the locking grooves, when the braking pin slides to the unlocking position, the braking pin is retracted from the locking groove.

According to another aspect of the present application, a child carrier is provided, including above-mentioned frame and a passenger compartment supported by the frame.

Details of one or more embodiments of the present application are set forth in the following drawings and descriptions. Other objects, purposes and advantages will become apparent upon review of the following specification, drawings and claims.

BRIEF DESCRIPTION OF THE DRAWINGS

In order to illustrate the embodiments of the present application more clearly, the drawings used in the embodiments will be described briefly. Apparently, the following described drawings are merely for the embodiments of the present application, and other drawings can be derived by those of ordinary skill in the art without any creative effort.

DETAILED DESCRIPTION OF THE EMBODIMENTS

Figure 1:
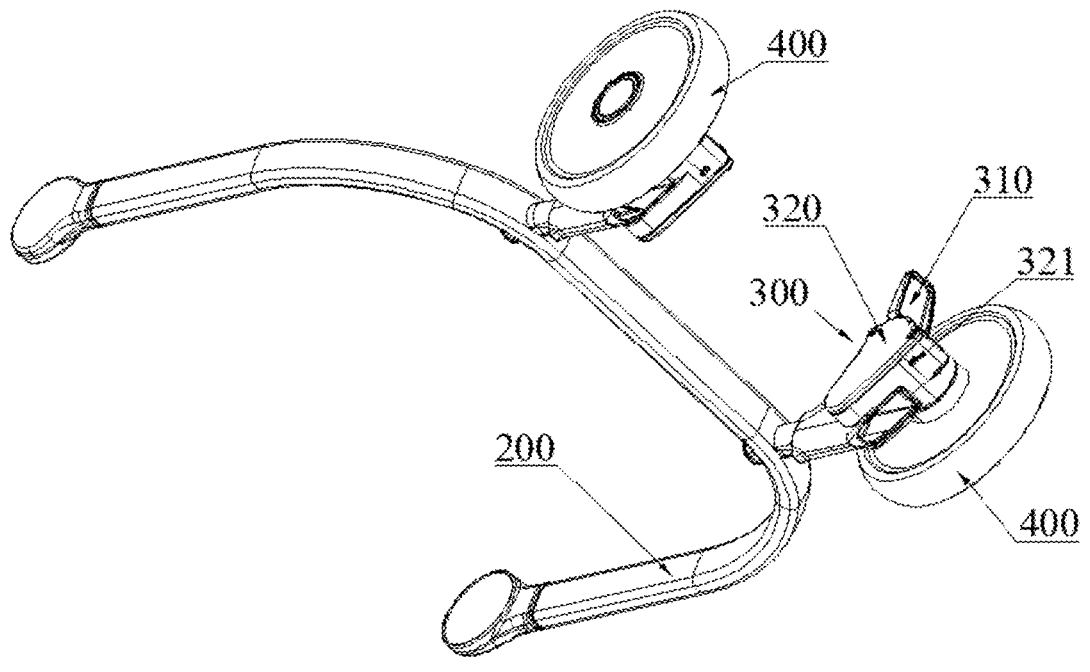
FIG. 1 shows a frame and its wheels of a conventional baby carrier.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
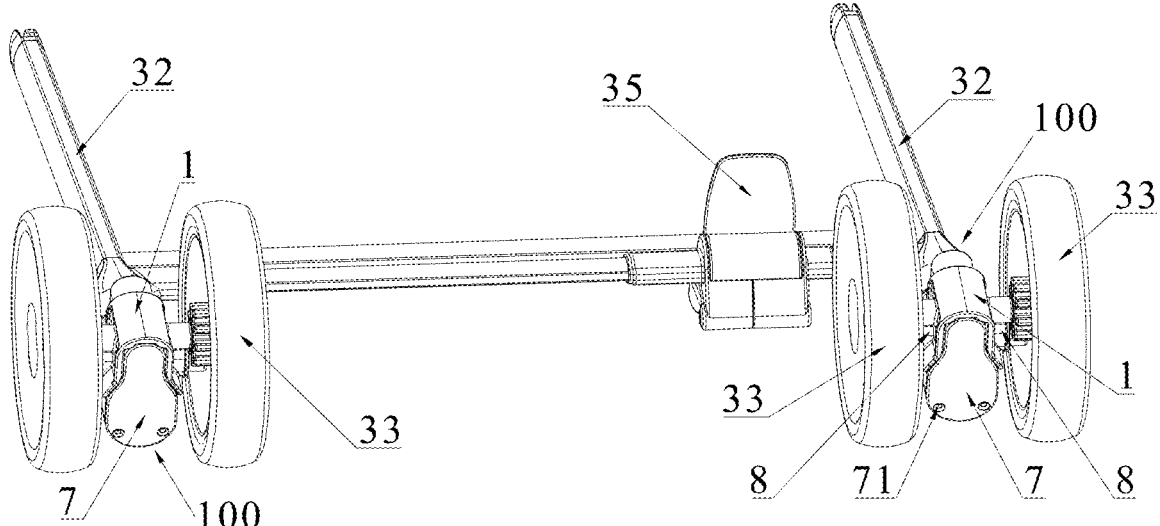
FIG. 2 is a perspective view of a frame and its wheels according to an embodiment of the present application.
Figure 3:
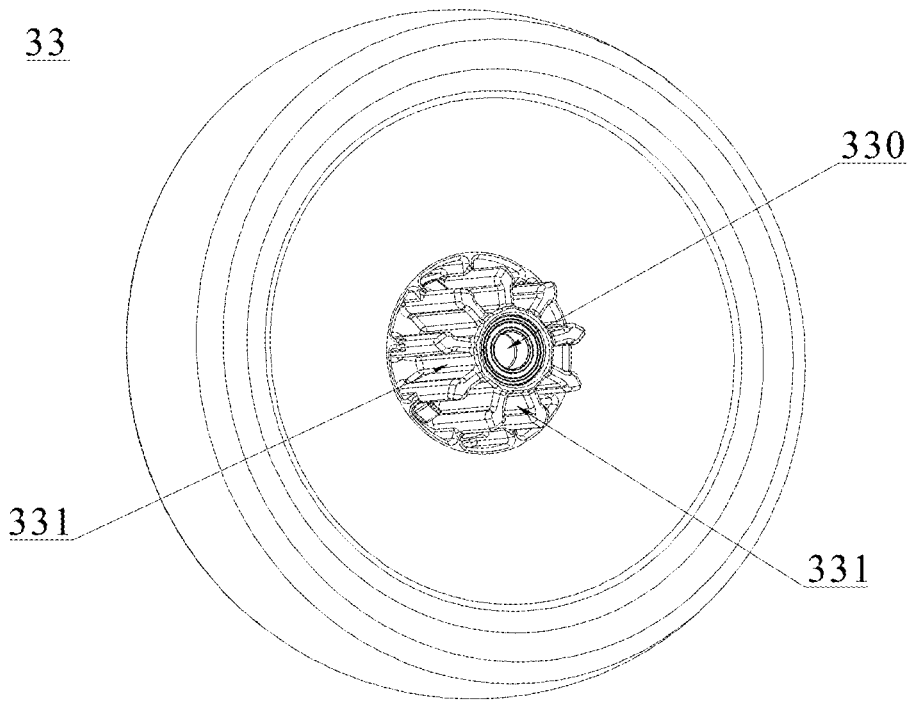
FIG. 3 is a perspective view of a wheel in FIG. 2.

FIG. 2 shows a partial structure of a frame having a wheel braking mechanism 100, and FIG. 3 shows a structure of a wheel 33 of the frame. FIGS. 4 to 9 show a structure of the wheel braking mechanism 100 according to the first embodiment of the present application.

Referring to FIG. 2, the frame can be a support frame with wheels, which can include two legs 32, the wheels 33, and two wheel braking mechanisms 100. As can be seen from FIG. 2, the frame is provided with a one-step double-brake system. The two wheel braking mechanisms 100 are mounted at the bottoms of the left and right legs 32, respectively, and two wheels 33 are symmetrically mounted on both sides of each wheel brake mechanism 100. The leg 32 can be made of a hollow pipe. A driving member 35 of the one-step double-brake system is drivingly connected to braking pins 8 (see FIG. 4) of the two wheel brake mechanisms 100, respectively, for example, through two steel wires arranged in an inner hole (not shown) of the leg 32. When the driving member 35 is stepped on, the driving member 35 simultaneously drives the braking pins 8 of each wheel braking mechanism 100 to act through the steel wires, so as to simultaneously lock the corresponding wheels 33. In this embodiment, the braking pins 8 of each wheel braking mechanism 100 are configured to lock the corresponding two wheels 33. It should be understood that in other embodiments, each wheel braking mechanism 100 may be configured to lock only one of the corresponding two wheels 33. In addition, in other embodiments, only one wheel 33 may be mounted on each wheel braking mechanism 100, and the braking pin 8 of each wheel braking mechanism 100 is configured to lock the corresponding one wheel 33.

Figure 4:
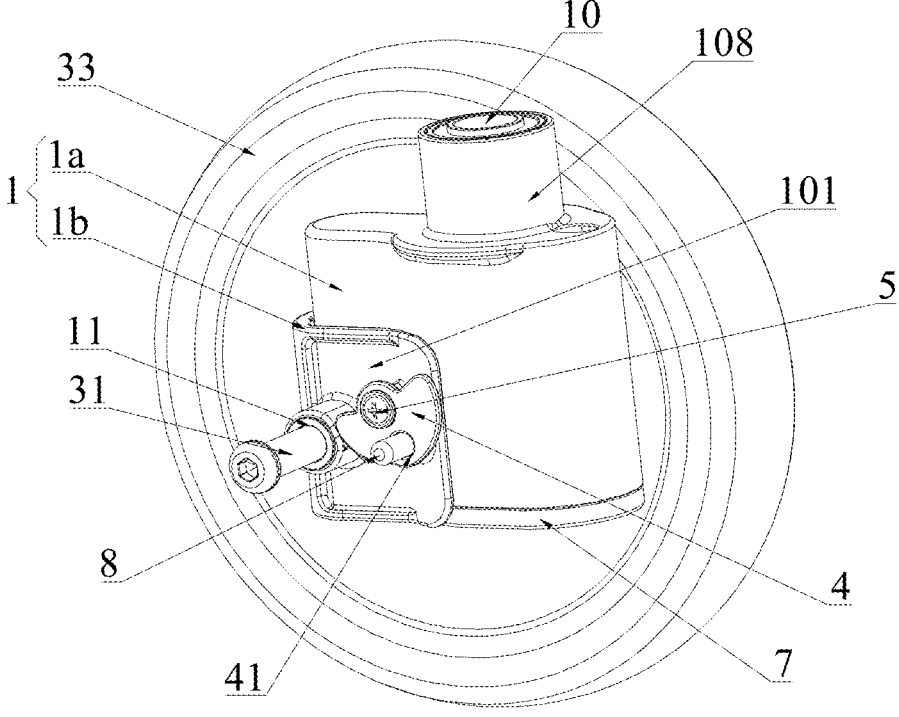
FIG. 4 is a perspective view of a wheel braking mechanism and the wheel according to a first embodiment of the present application.

FIG. 4 is a perspective view of the wheel braking mechanism 100 and a wheel 33 mounted on the wheel braking mechanism 100. The wheel braking mechanism 100 may include a wheel base housing assembly 1, a braking assembly 2, and the aforementioned braking pin 8.

In this embodiment, the wheel base housing assembly 1 includes a main housing 1a and a side sheath 1b attached to the main housing 1a. In other embodiments, the wheel base housing assembly 1 may have other formation. Referring to FIG. 2 and FIG. 4, the wheel base housing assembly 1 is connected to the leg 32. In some embodiments, a top of the wheel base housing assembly 1 may be provided with a mounting post 108 protruding upwardly. The mounting post 108 can be vertically inserted into the inner hole of the leg 32. The mounting post 108 has a hollow channel 10, the steel wire of the one-step double brake system enters the interior of the wheel base housing assembly 1 through the channel 10. Since the mounting post 108 is inserted into the inner hole of the leg 32, and an upper end of the channel 10 extends into the inner hole of the leg 32, so that the external debris cannot enter an interior of the wheel base housing assembly 1 through the channel 10.

A braking assembly 2 is mounted to the interior of the wheel base housing assembly 1. Specifically, the braking assembly 2 is operatively connected to the braking pin 8. An end of the braking pin 8 extends through a side wall 101 of the wheel base housing assembly 1, the end of the braking pin 8 can be engaged in a locking groove 331 of the wheel 33 to lock the wheel 33, or can be disengaged from the locking groove 331 to unlock the wheel 33. The steel wire entering the interior of the wheel base housing assembly 1 is operatively connected to the braking pin 8 through the braking assembly 2 to drive the braking pin 8 through the braking assembly 2, so as to move the braking pin 8 to a locking position for locking the wheel 33. When the wheel 33 does not need to be locked, the braking pin 8 can be driven by the braking assembly 2 to return to an unlocking position for unlocking the wheel 33. Details regarding the embodiment of the operable connection of the steel wire to the braking assembly 2, the operable connection of the braking assembly 2 to the braking pin 8, and the structure of the braking assembly 2 that are similar to those for the embodiment in the prior art, will not be repeated herein.

Figure 5:
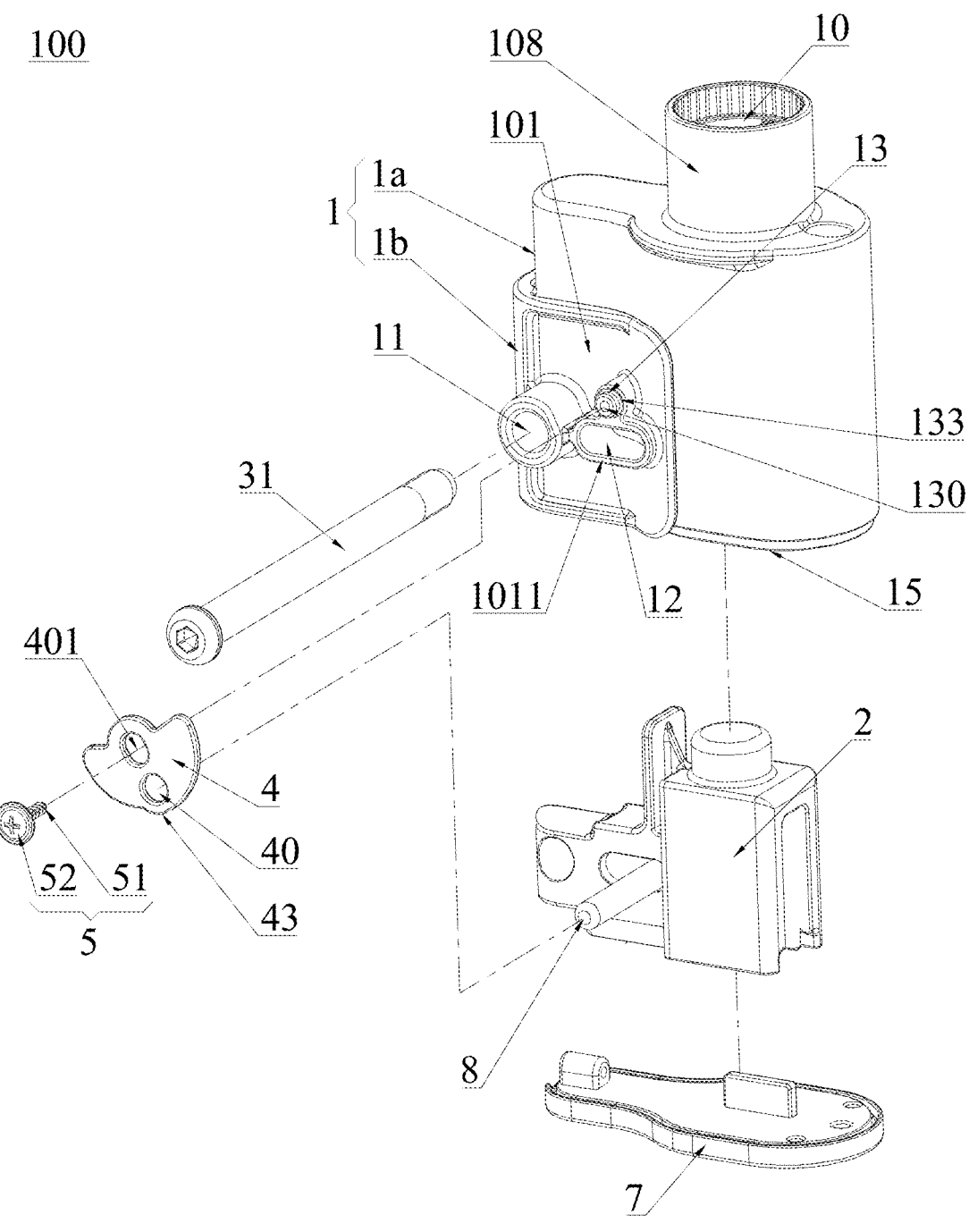
FIG. 5 is an exploded view of the wheel braking mechanism according to the first embodiment of the present application.

Referring to FIG. 2 and FIG. 5, in this embodiment, both opposite side walls 101 of the wheel base housing assembly 1 have a mounting hole 11 and a sliding hole 12. The mounting hole 11 can be a circular hole, a wheel shaft 31 is mounted in the mounting hole 11. Specifically, both ends of the wheel shaft 31 extend through the corresponding mounting hole 11 and are connected to the two wheels 33, respectively. The sliding hole 12 is, for example, a long slotted hole for the corresponding end of the braking pin 8 to extend through. The braking pin 8 and the wheel shaft 31 are arranged in parallel to each other. When the driving member 35 is stepped on, the steel wire of the one-step double brake system can drive the braking pin 8 to slide in the sliding hole 12 to the locking position. When the driving member 35 is lifted, the braking pin 8 can slide in the sliding hole 12 to return to the unlocking position. In an embodiment, a sliding direction of the braking pin 8 in the sliding hole 12 is a radial direction of the wheel 33.

Figure 6:
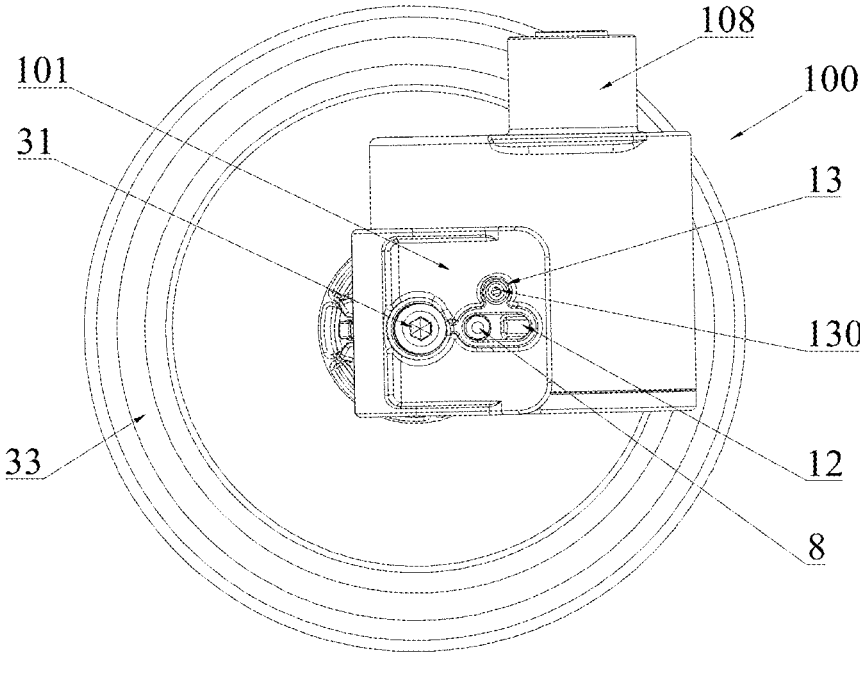
FIG. 6 is a side view of the wheel braking mechanism and the wheel according to the first embodiment of the present application, with a braking pin in a locking position and a dust shield being omitted.
Figure 7:
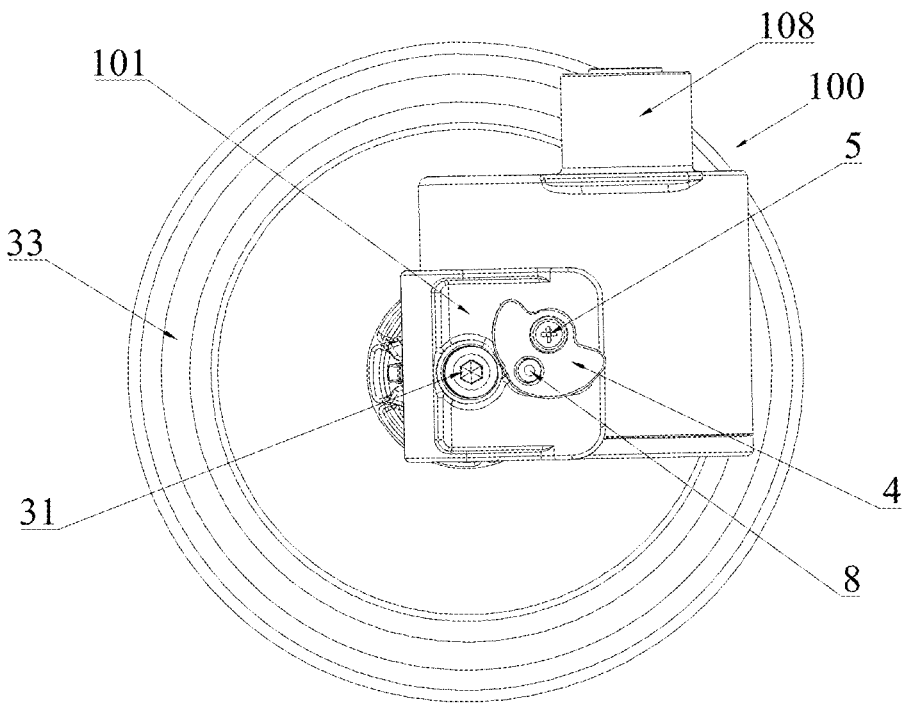
FIG. 7 is similar to FIG. 6, but shows the dust shield.
Figure 8:
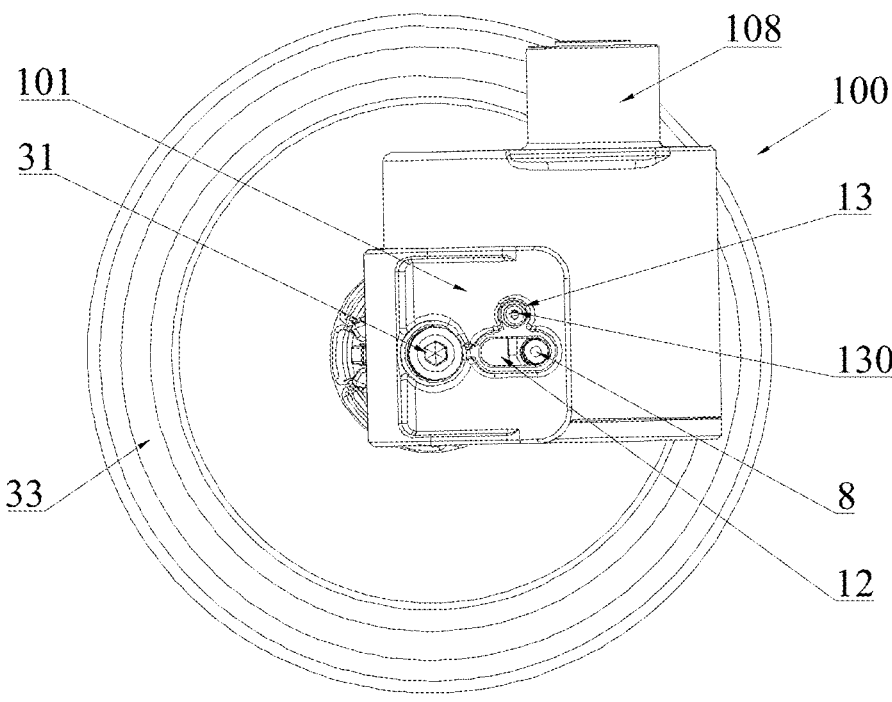
FIG. 8 is a front side view of the wheel braking mechanism and the wheel according to the first embodiment of the present application, with the braking pin in a unlocking position and a dust shield being omitted.
Figure 9:
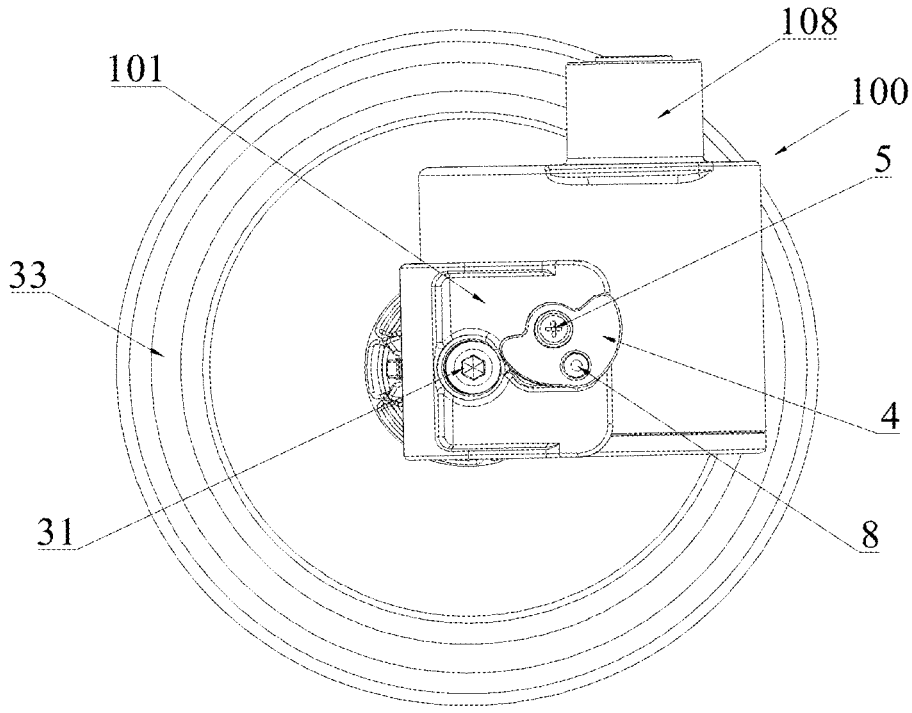
FIG. 9 is similar to FIG. 8, but shows the dust shield.

FIG. 3 is a perspective view of another wheel 33 removed from the wheel braking mechanism 100. The two wheels 33 located on both sides of the wheel braking mechanism 100 may have a symmetrical structure to each other. A wheel hub of the wheel 33 is provided with a hole 330 for mounting the wheel shaft 31 and is circumferentially provided with a plurality of locking grooves 331. In this embodiment, the plurality of locking grooves 331 is arranged adjacent to a radial center of the wheel 33. Referring to FIG. 3, FIG. 5 and FIG. 6, when the braking pin 8 moves, for example, to an end of the sliding hole 12 adjacent to the mounting hole 11, the braking pin 8 reaches the locking position and snaps into any locking groove 331. Referring to FIG. 3, FIG. 5 and FIG. 8, when the braking pin 8 moves to an end of the sliding hole 12 away from the mounting hole 11, the braking pin 8 reaches the unlocking position and retracts from the locking groove 331. It should be understood that, in alternative embodiments, the plurality of locking grooves 331 can be arranged away from the radial center of the wheel 33; when the braking pin 8 moves radially outwards, it snaps into any locking groove 331, and when the braking pin 8 moves radially inward, it retracts from the locking groove 331.

The bottom of the wheel base housing assembly 1 has a mounting opening 15, through which the braking assembly 2 can be mounted into the interior of the wheel base housing assembly 1. In order to prevent debris from entering the interior of the wheel base housing assembly 1 from the mounting opening 15, the wheel braking mechanism 100 can further include a dust-proof cover 7 for closing the mounting opening 15. In an embodiment, the dust-proof cover 7 is fixed to the bottom of the wheel housing assembly 1 by screws 71.

In order to prevent debris from entering the interior of the wheel base housing assembly 1 from the sliding hole 12, the wheel braking mechanism 100 further includes a dust shield 4, the dust shield 4 is directly or indirectly engaged with the braking pin 8, and the dust shield 4 keeps shielding (also can be referred to as covering) the sliding hole 12. It should be understood that when the braking pin 8 moves in the sliding hole 12, a position of the dust shield 4 will change accordingly. By properly configuring a structure of the dust shield 4, the dust shield 4 can keep shielding the sliding hole 12 all the time. In an embodiment, the dust shield 4 at least keeps shielding a gap between the sliding hole 12 and the braking pin 8, so as to prevent the external debris from entering the interior of the wheel base housing assembly 1 through the sliding hole 12. In some embodiments, the dust shield 4 can cover the sliding hole 12 outside the side wall 101, and in other embodiments, the dust shield 4 can cover the sliding hole 12 inside the side wall 101. The dust shield 4 may be movably connected (e.g., pivoted and/or slidably connected) to the wheel base housing assembly 1 to allow the dust shield 4 to change position.

Referring to FIG. 4, FIG. 5, FIG. 7 and FIG. 9, in this embodiment, the dust shield 4 may shield the sliding hole 12 outside the side wall 101. Based on above, it can be seen that in this embodiment, the two wheels 33 have a substantially symmetrical structure, the wheel hub of each wheel 33 is provided with the plurality of locking grooves 331, the two opposite side walls 101 of the wheel base housing assembly 1 are provided with the sliding hole 12 respectively, and the two ends of the braking pin 8 protrude from the sliding holes 12 of the two side walls 101 respectively to cooperate with the locking grooves 331 on the corresponding wheels 33. Therefore, two dust shields 4 can be provided accordingly (only one is shown in FIG. 4), so as to shield the sliding holes 12 on the two side walls 101 respectively. It should be understood that, in some alternative embodiments, one wheel braking mechanism 100 may only correspond to one wheel 33 having the locking groove 331. At this time, the wheel base housing assembly 1 may only have one sliding hole 12 on one side wall 101, one end of the braking pin 8 protrudes from the one sliding hole 12 to cooperate with the locking groove 331 on the wheel 33, and only one dust shield 4 is provided correspondingly. In some other embodiments, one wheel braking mechanism 100 is configured with two wheels 33 that are both provided with the locking groove 331, at this time, the wheel base housing assembly 1 can still only be provided with one sliding hole on one side wall 101. One end of the braking pin 8 protrudes from the one sliding hole 12 to cooperate with the locking groove 331 on the corresponding wheel 33. At this time, only one dust shield 4 is provided accordingly.

Referring to FIG. 5, the dust shield 4 may have an adjusting hole 401 and a through hole 40, the dust shield 4 is pivotally connected to the side wall 101 through a pivot shaft 13 extending through the adjusting hole 401. The adjusting hole 401 is, for example, a long slotted hole, the braking pin 8 extends through the through hole 40, the through hole 40 is, for example, a circular hole. When the braking pin 8 slides in the sliding hole 12 to move to the locking position or the unlocking position, the dust shield 4 is driven by the braking pin 8 to rotate around the pivot shaft 13, and relative sliding can occur between the adjusting hole 401 and the pivot shaft 13, so as not to interfere with a sliding of the braking pin 8. The dust shield 4 can be designed in any suitable shape, so that when the braking pin 8 slides in the sliding hole 12, the dust shield 4 keeps shielding the sliding hole 12 all the time. It should be understood that when the braking pin 8 slides to the locking position or the unlocking position, the dust shield 4 still shields the sliding hole 12. Since the dust shield 4 always shields the sliding hole 12, the external debris is not easy to directly enter the interior of the wheel base housing assembly 1 through the sliding hole 12, thereby preventing the braking assembly 2 from being unable to normally drive the braking pin 8 due to an influence of the debris. In an embodiment, the surfaces of the dust shield 4 and the side wall 101 are attached to each other, so as to achieve a better dust-proof and debris-proof effect. In an embodiment, an end of the side wall 101 corresponding to the sliding hole 12 may be provided with a flat platform 1011 configured to fit and contact the dust shield 4 with each other.

In an embodiment, the dust shield 4 is substantially fan-shaped (the shape is similar to a fan), the adjusting hole 401 and the through hole 40 are located in a center of the dust shield 4, and the through hole 40 is closer to a curved outer edge 43 of the dust shield 4 than the adjusting hole 401. In this way, the dust shield 4 can shield the sliding hole 12 with a smaller area of the dust shield 4. In practical applications, the dust shield 4 may have a symmetrical or asymmetrical shape, and may also be designed in other corresponding shapes according to actual needs.

Referring to FIG. 5, in this embodiment, the pivot shaft 13 may be formed by a boss protruding outward from the side wall 101, the dust shield 4 is sleeved on the pivot shaft 13 through the adjusting hole 401. An end surface of the pivot shaft 13 is provided with a threaded hole 130. The wheel braking mechanism 100 further includes a fastener 5, a tail portion 51 of the fastener 5 is threadedly engaged in the threaded hole 130, and a head portion 52 of the fastener 5 prevents the dust shield 4 from falling off from the pivot shaft 13. In an embodiment, a step portion 133 may be provided on the pivot shaft 13, the dust shield 4 is sandwiched between the step portion 133 and the head portion 52. In this embodiment, although the adjusting hole 401 is a long slotted hole, since the pivot shaft 13 protrudes from the side wall 101, and the tail portion 51 is threadedly engaged in the threaded hole 130, the external debris is not easy to enter the interior of the wheel housing assembly 1 through the adjusting hole 401.

In an embodiment, by reasonably designing a size of the head portion 52 of the fastener 5, when the pivot shaft 13 slides relative to the adjusting hole 401, the head portion 52 of the fastener 5 keeps shielding the adjusting hole 401. In this way, it can prevent the sliding of the pivot shaft 13 in the adjusting hole 401 from being blocked by the external debris entering the adjusting hole 401, which cannot be easily discharged from the adjusting hole 401.

It should be noted that although in this embodiment, the sliding hole 12 and the adjusting hole 401 are both long slotted hole, in alternative embodiments, the sliding hole 12 and the adjusting hole 401 can have any suitable shapes, as long as it does not affect the locking and unlocking action of the braking pin 8 on the wheel 33 and a shielding effect of the dust shield 4 on the sliding hole 12. For example, the sliding hole 12 and the adjusting hole 401 may be arc-shaped holes.

Figure 10:
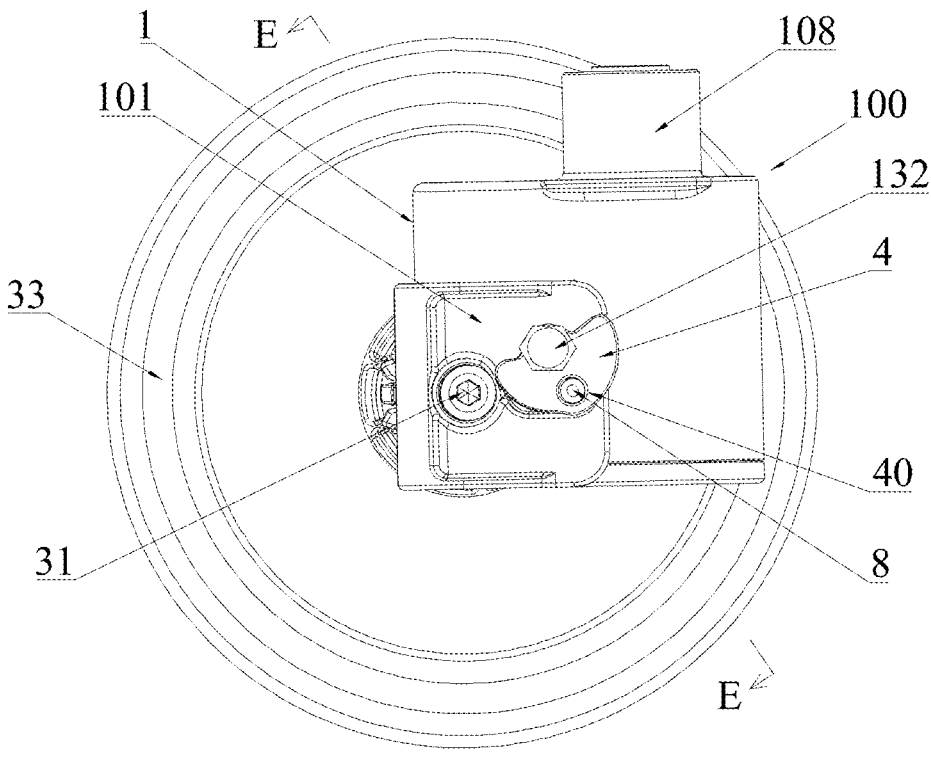
FIG. 10 is a side view of the wheel braking mechanism and the wheel according to a second embodiment of the present application.
Figure 11:
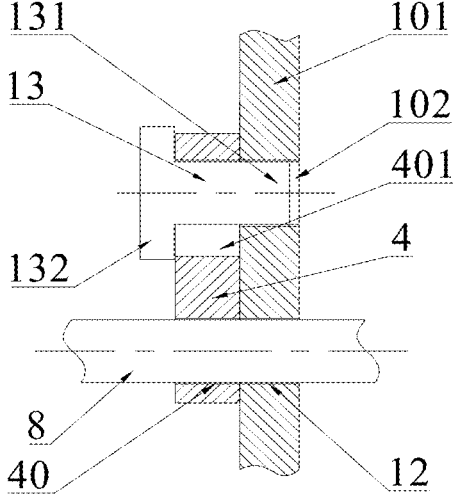
FIG. 11 is a partial cross-sectional view taken along line E-E of FIG. 10.

FIG. 10 and FIG. 11 show a structure of the wheel braking mechanism 100 according to the second embodiment of the present application. This embodiment is a modification of the above-mentioned first embodiment, and a difference between this embodiment and the above-mentioned first embodiment will be mainly described below.

Referring to FIG. 10 and FIG. 11, in this embodiment, the structure of the dust shield 4 can be substantially the same as that of the dust shield 4 in the above-mentioned first embodiment, and the dust shield 4 has the adjusting hole 401 and the through hole 40. A connecting hole 102 is provided on the side wall 101, and the connecting hole 102 is, for example, a threaded hole. The pivot shaft 13 may be formed by a bolt extending through the adjusting hole 401 of the dust shield 4 and the connecting hole 102 of the side wall 101. In an embodiment, the tail portion 131 of the pivot shaft 13 extends through the adjusting hole 401 and is threadedly engaged in the connecting hole 102, and the head portion 132 of the bolt can prevent the dust shield 4 from falling off from the pivot shaft 13.

Referring to FIG. 10 and FIG. 11, and in combination with the description of the first embodiment above, it can be seen that the braking pin 8 extends through the through hole 40 and the sliding hole 12. When the braking pin 8 moves in the sliding hole 12 to the locking position or the unlocking position, the dust shield 4 is driven by the braking pin 8 to rotate around the pivot shaft 13, relative sliding can occur between the adjusting hole 401 and the pivot shaft 13 so as not to interfere with the sliding of the braking pin 8. When the braking pin 8 slides in the sliding hole 12, the dust shield 4 keeps shielding the sliding hole 12. In this way, the external debris is not easy to enter the interior of the wheel base housing assembly 1 through the sliding hole 12, and it is not easy to enter the interior of the housing assembly 1 through the adjusting hole 401 and the connecting hole 102.

Referring to FIG. 11, by properly designing the size of the head portion 132 of the pivot shaft 13, when the pivot shaft 13 slides relative to the adjusting hole 401, the head portion 132 of the pivot shaft 13 keeps shielding the adjusting hole 401. In this way, it can prevent the sliding of the pivot shaft 13 in the adjusting hole 401 from being blocked by the external debris entering the adjusting hole 401, which cannot be easily discharged from the adjusting hole 401.

Figure 12:
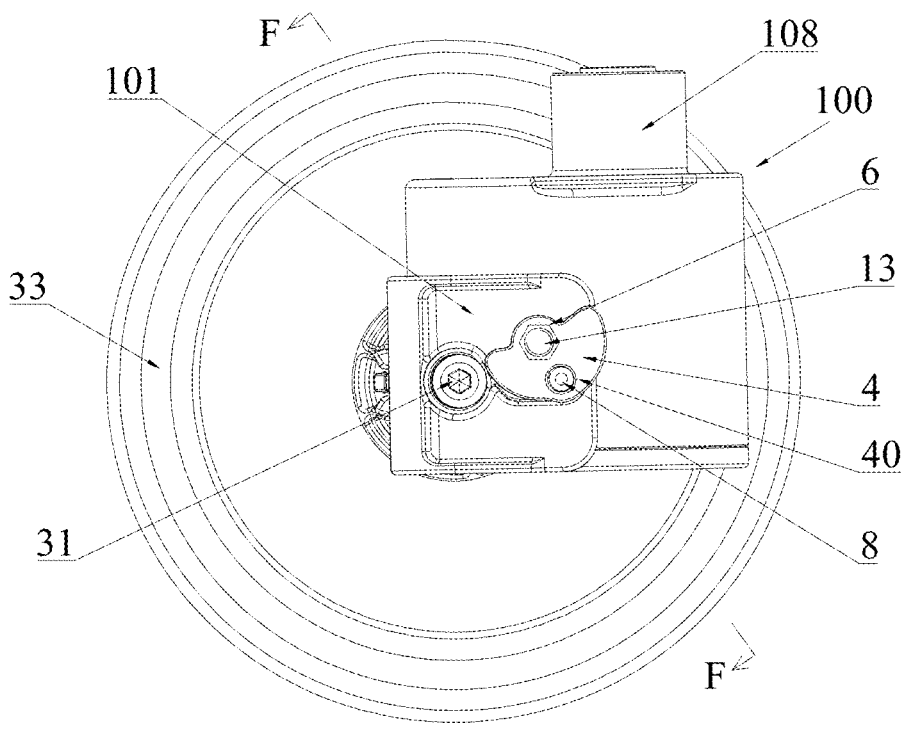
FIG. 12 is a side view of the wheel braking mechanism and the wheel according to a third embodiment of the present application.
Figure 13:
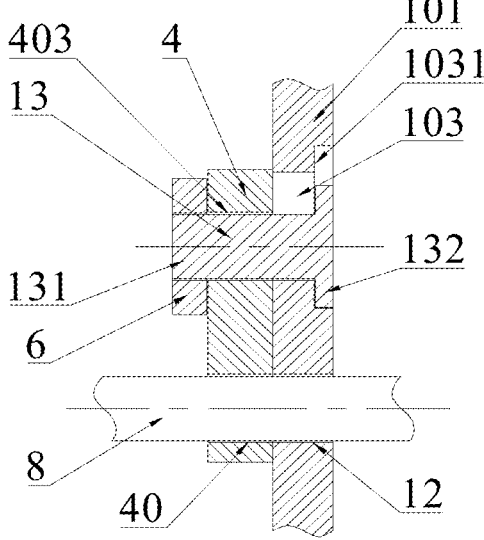
FIG. 13 is a partial cross-sectional view taken along line F-F of FIG. 12.
Figure 14:
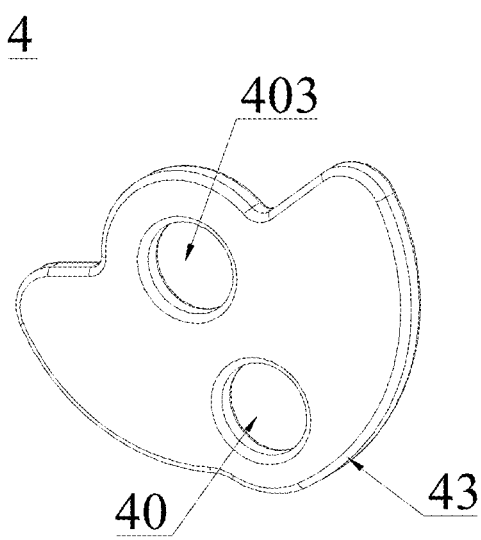
FIG. 14 is a perspective view of the dust shield of the wheel braking mechanism according to the third embodiment of the present application.

FIGS. 12 to 14 show the structure of a structure of the wheel braking mechanism 100 according to a third embodiment of the present application. This embodiment is a modification of the above-mentioned second embodiment, and the difference between this embodiment and the above-mentioned second embodiment will be mainly described below.

Referring to FIG. 14, in this embodiment, the dust shield 4 is substantially fan-shaped (the shape is similar to a fan), and the dust shield 4 is provided with a through hole 40 and a connecting hole 403. The through hole 40 allows the braking pin 8 to extend through. The through hole 40 and the connecting hole 403 may be circular holes. The through hole 40 is arranged closer to the curved outer edge 43 of the dust shield 4 than the connecting hole 403. An adjusting hole 103 may be provided on the side wall 101 of the wheel base housing assembly 1. The adjusting hole 103 is, for example, a long slotted hole. An extension direction of the adjusting hole 103 is, for example, perpendicular to an extension direction of the sliding hole 12, so as to facilitate manufacturing. The pivot shaft 13 is formed by a bolt extending through the adjusting hole 103 and the connecting hole 403. In this embodiment, the tail portion 131 of the pivot shaft 13 can extend through the adjusting hole 103 and the connecting hole 403 from the interior of the wheel base housing assembly 1 and then is threadedly connected to a nut 6, and the nut 6 can prevent the dust shield 4 from falling off from the pivot shaft 13.

Referring to FIG. 12 to FIG. 14, and in combination with the description of the first embodiment and the second embodiment above, it can be seen that the braking pin 8 extends through the through hole 40 and the sliding hole 12. When the braking pin 8 moves in the sliding hole 12 to the locking position or the unlocking position, the dust shield 4 is driven by the braking pin 8 to rotate around the pivot shaft 13, relative sliding can occur between the pivot shaft 13 and the adjusting hole 103 of the side wall 101, so as not to interfere with the sliding of the braking pin 8. When the braking pin 8 slides in the sliding hole 12, the dust shield 4 keeps shielding the sliding hole 12. In this way, the external debris is not easy to enter the interior of the wheel base housing assembly 1 through the lower sliding hole 12.

Referring to FIG. 12 and FIG. 13, by properly designing the size of the dust shield 4, when the pivot shaft 13 slides relative to the adjusting hole 103, the dust shield 4 keeps shielding the adjusting hole 103. In this way, the external debris is not easy to enter the interior of the wheel base housing assembly 1 through the adjusting hole 103.

Referring to FIG. 13, a step portion 1031 may be formed in the adjusting hole 103, the head portion 132 of the pivot shaft 13 may abut against the step portion 1031. In an embodiment, the head portion 132 of the pivot shaft 13 does not protrude toward the interior of the wheel base housing assembly 1 relative to a surface of the side wall 101. That is, the head portion 132 of the pivot shaft 13 is completely located in the adjustment hole 103, so that an impact of the head portion 132 of the pivot shaft 13 on an inner space of the wheel base housing assembly 1 can be reduced.

The embodiment of the present application also provides a frame, which can include the wheel braking mechanism in any of the above embodiments.

An embodiment of the present application also provides a child carrier, which may include the aforementioned frame and a passenger compartment supported by the frame, the passenger compartment is configured to provide a seating space for children. The child carrier may, for example, be a child's pushchair, a movable child's dining chair, etc.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present application, but are not intended to limit the protection scope of the present application. Any variation or replacement readily figured out by a person skilled in the art within the technical scope disclosed in the present application shall all fall within the protection scope of the present application. Therefore, the protection scope of the present application shall be subject to the protection scope of the appended claims.

What is claimed is:

1. A wheel braking mechanism, comprising:
a wheel base housing assembly, a side wall of the wheel base housing assembly being provided with a sliding hole;
a braking assembly mounted in the wheel base housing assembly;
a braking pin connected to the braking assembly, the braking pin being configured to slide in the sliding hole between a locking position and an unlocking position; and
a dust shield engaged with the braking pin;
wherein when the braking pin slides in the sliding hole to the locking position and the unlocking position, the dust shield shields an entirety of the sliding hole.

2. The wheel braking mechanism according to claim 1, wherein the dust shield is movably connected to the wheel base housing assembly.

3. The wheel braking mechanism according to claim 1, wherein the dust shield shields the entirety of the sliding hole outside the side wall.

4. The wheel braking mechanism according to claim 1, wherein the dust shield is provided with a through hole, the braking pin extends through the through hole.

5. The wheel braking mechanism according to claim 1, wherein the dust shield is pivotally connected to the side wall through a pivot shaft, one of the dust shield and the side wall is provided with an adjusting hole, the pivot shaft extends through the adjusting hole.

6. The wheel braking mechanism according to claim 5, wherein the sliding hole and the adjusting hole are both slotted holes.

7. The wheel braking mechanism according to claim 5, wherein the pivot shaft is formed by a boss protruding outward from the side wall, and the adjusting hole is provided on the dust shield.

8. The wheel braking mechanism according to claim 5, wherein a threaded hole is provided on an end surface of the pivot shaft, the wheel braking mechanism further comprises a fastener, and a tail portion of the fastener is threadedly engaged in the threaded hole.

9. The wheel braking mechanism according to claim 8, wherein when the pivot shaft slides relative to the adjusting hole, a head portion of the fastener shields the adjusting hole.

10. The wheel braking mechanism according to claim 5, wherein the dust shield is substantially fan-shaped and is provided with a through hole, the braking pin extends through the through hole, the adjusting hole and the through hole are located at a center of the dust shield, and the through-hole is located closer to a curved outer edge of the dust shield than the adjusting hole.

11. The wheel braking mechanism according to claim 5, wherein one of the side wall and the dust shield is provided with the adjusting hole, and the other one thereof is provided with a connecting hole, the pivot shaft extends through the adjusting hole and the connecting hole.

12. The wheel braking mechanism according to claim 11, wherein the adjusting hole is provided on the dust shield, the connecting hole is provided on the side wall, a tail portion of the pivot shaft extends through the adjusting hole and is engaged in the connecting hole.

13. The wheel braking mechanism according to claim 12, wherein when the pivot shaft slides relative to the adjusting hole, a head portion of the pivot shaft shields the adjusting hole.

14. The wheel braking mechanism according to claim 11, wherein the adjusting hole is provided on the side wall, the connecting hole is provided on the dust shield, a tail portion of the pivot shaft extends through the adjusting hole and the connecting hole sequentially from an inside of the wheel housing assembly.

15. The wheel braking mechanism according to claim 14, wherein when the pivot shaft slides relative to the adjusting hole, the dust shield shields the adjusting hole.

16. The wheel braking mechanism according to claim 14, wherein an extending direction of the adjusting hole and an extending direction of the sliding hole are perpendicular to each other.

17. The wheel braking mechanism according to claim 5, wherein a step portion is provided in the adjusting hole, a head portion of the pivot shaft abuts against the step portion.

18. The wheel braking mechanism according to claim 17, wherein the head portion is completely located in the adjustment hole.

19. The wheel braking mechanism according to claim 1, wherein a bottom of the wheel base housing assembly is provided with a mounting opening, and the wheel braking mechanism further comprises a dust-proof cover configured to seal the mounting opening.

20. A frame, comprising:
the wheel braking mechanism according to claim 1;
a leg connected to the wheel base housing assembly; and
a wheel, wherein a wheel shaft of the wheel is connected to the wheel base housing assembly, a wheel hub of the wheel is circumferentially provided with a plurality of locking grooves, when the braking pin slides to the locking position, the braking pin is snapped into one of the locking grooves, and when the braking pin slides to the unlocking position, the braking pin is retracted from the locking groove.

21. The frame according to claim 20, wherein a top of the wheel base housing assembly is provided with a mounting post protruding upwardly, the leg is provided with an inner hole, and the mounting post is inserted into the inner hole.

22. The frame according to claim 20, wherein the dust shield is movably connected to the wheel base housing assembly.

23. The frame according to claim 20, wherein the dust shield shields the entirety of the sliding hole outside the side wall.

24. The frame according to claim 20, wherein the dust shield is provided with a through hole, the braking pin extends through the through hole.

25. The frame according to claim 20, wherein the dust shield is pivotally connected to the side wall through a pivot shaft, one of the dust shield and the side wall is provided with an adjusting hole, the pivot shaft extends through the adjusting hole.

26. The frame according to claim 25, wherein the sliding hole and the adjusting hole are both slotted holes.

27. The frame according to claim 25, wherein the pivot shaft is formed by a boss protruding outward from the side wall, and the adjusting hole is provided on the dust shield.

28. The frame according to claim 25, wherein a threaded hole is provided on an end surface of the pivot shaft, the wheel braking mechanism further comprises a fastener, and a tail portion of the fastener is threadedly engaged in the threaded hole.

29. The frame according to claim 28, wherein when the pivot shaft slides relative to the adjusting hole, a head portion of the fastener shields the adjusting hole.

30. The frame according to claim 25, wherein the dust shield is substantially fan-shaped and is provided with a through hole, the braking pin extends through the through hole, the adjusting hole and the through hole are located at a center of the dust shield, and the through-hole is located closer to a curved outer edge of the dust shield than the adjusting hole.

31. The frame according to claim 25, wherein one of the side wall and the dust shield is provided with the adjusting hole, and the other one thereof is provided with a connecting hole, the pivot shaft extends through the adjusting hole and the connecting hole.

32. The frame according to claim 31, wherein the adjusting hole is provided on the dust shield, the connecting hole is provided on the side wall, a tail portion of the pivot shaft extends through the adjusting hole and is engaged in the connecting hole.

33. The frame according to claim 32, wherein when the pivot shaft slides relative to the adjusting hole, a head portion of the pivot shaft shields the adjusting hole.

34. The frame according to claim 31, wherein the adjusting hole is provided on the side wall, the connecting hole is provided on the dust shield, a tail portion of the pivot shaft extends through the adjusting hole and the connecting hole sequentially from an inside of the wheel housing assembly.

35. The frame according to claim 34, wherein when the pivot shaft slides relative to the adjusting hole, the dust shield shields the adjusting hole.

36. The frame according to claim 34, wherein an extending direction of the adjusting hole and an extending direction of the sliding hole are perpendicular to each other.

37. The frame according to claim 25, wherein a step portion is provided in the adjusting hole, a head portion of the pivot shaft abuts against the step portion.

38. The frame according to claim 27, wherein the head portion is completely located in the adjustment hole.

39. The frame according to claim 20, wherein a bottom of the wheel base housing assembly is provided with a mounting opening, and the wheel braking mechanism further comprises a dust-proof cover configured to seal the mounting opening.

40. A child carrier, comprising the frame according to claim 20 and a passenger compartment supported by the frame.

41. The child carrier according to claim 40, wherein the dust shield is movably connected to the wheel base housing assembly.

42. The child carrier according to claim 40, wherein the dust shield shields the entirety of the sliding hole outside the side wall.

43. The child carrier according to claim 40, wherein the dust shield is provided with a through hole, the braking pin extends through the through hole.

44. The child carrier according to claim 40, wherein the dust shield is pivotally connected to the side wall through a pivot shaft, one of the dust shield and the side wall is provided with an adjusting hole, the pivot shaft extends through the adjusting hole.

45. The child carrier according to claim 44, wherein the sliding hole and the adjusting hole are both slotted holes.

46. The child carrier according to claim 44, wherein the pivot shaft is formed by a boss protruding outward from the side wall, and the adjusting hole is provided on the dust shield.

47. The child carrier according to claim 44, wherein a threaded hole is provided on an end surface of the pivot shaft, the wheel braking mechanism further comprises a fastener, and a tail portion of the fastener is threadedly engaged in the threaded hole.

48. The child carrier according to claim 47, wherein when the pivot shaft slides relative to the adjusting hole, a head portion of the fastener shields the adjusting hole.

49. The child carrier according to claim 44, wherein the dust shield is substantially fan-shaped and is provided with a through hole, the braking pin extends through the through hole, the adjusting hole and the through hole are located at a center of the dust shield, and the through-hole is located closer to a curved outer edge of the dust shield than the adjusting hole.

50. The child carrier according to claim 44, wherein one of the side wall and the dust shield is provided with the adjusting hole, and the other one thereof is provided with a connecting hole, the pivot shaft extends through the adjusting hole and the connecting hole.

51. The child carrier according to claim 50, wherein the adjusting hole is provided on the dust shield, the connecting hole is provided on the side wall, a tail portion of the pivot shaft extends through the adjusting hole and is engaged in the connecting hole.

52. The child carrier according to claim 51, wherein when the pivot shaft slides relative to the adjusting hole, a head portion of the pivot shaft shields the adjusting hole.

53. The child carrier according to claim 50, wherein the adjusting hole is provided on the side wall, the connecting hole is provided on the dust shield, a tail portion of the pivot shaft extends through the adjusting hole and the connecting hole sequentially from an inside of the wheel housing assembly.

54. The child carrier according to claim 53, wherein when the pivot shaft slides relative to the adjusting hole, the dust shield shields the adjusting hole.

55. The child carrier according to claim 53, wherein an extending direction of the adjusting hole and an extending direction of the sliding hole are perpendicular to each other.

56. The child carrier according to claim 44, wherein a step portion is provided in the adjusting hole, a head portion of the pivot shaft abuts against the step portion.

57. The child carrier according to claim 56, wherein the head portion is completely located in the adjustment hole.

58. The child carrier according to claim 40, wherein a bottom of the wheel base housing assembly is provided with a mounting opening, and the wheel braking mechanism further comprises a dust-proof cover configured to seal the mounting opening.

* * * * *